United States Patent Office 3,796,785
Patented Mar. 12, 1974

3,796,785
METHOD OF STRETCHING A THERMOPLASTIC SHEET USING A SHORTENED STRETCHING ZONE
Wilhelm Rest and Karl Huff, Dormagen, Germany, assignors to Bayer Aktiengesellschaft, Leverkusen, Germany
Continuation-in-part of application Ser. No. 19,112, Mar. 12, 1970, which is a continuation-in-part of application Ser. No. 616,320, Feb. 15, 1967, both now abandoned. This application Mar. 15, 1971, Ser. No. 124,433
Int. Cl. B29d 7/24
U.S. Cl. 264—288
9 Claims

ABSTRACT OF THE DISCLOSURE

A method and apparatus for stretching thermoplastic in a shortened gap between a heated feed roller and a heated delivery roller, the temperature of the feed roller being maintained below the softening temperature of the thermoplastic in its unstretched state and the temperature of the delivery roller being maintained above the softening temperature of the thermoplastic in its unstretched state and below softening the temperature of the thermoplastic in its stretched state.

---

Figure 1:
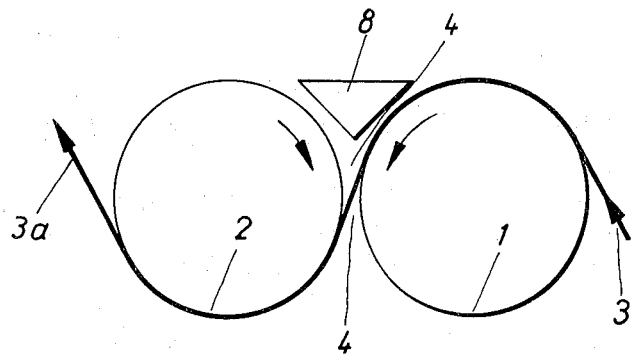

This application is a continuation-in-part of Ser. No. 19,112, filed Mar. 12, 1970, now abandoned, which is a continuation-in-part of Ser. No. 616,320, filed Feb. 15, 1967, now abandoned. The disclosure herein duplicates the disclosure in said Ser. No. 616,320.

This invention relates to thermoplastic sheeting and more specifically, to a method for stretching thermoplastic materials, particularly polycarbonates, and an apparatus for carrying out the stretching operation.

In the processing of thermoplastic sheets and the like, it is often advantageous to subject the material being produced to a stretching operation in order to improve the properties of the thermoplastic in the sheet and the like form. Great care must be utilized in the stretching of the materials, however, in order to insure that the sheet and the like leave the stretching operation at a uniform thickness with uniform properties while maintaining its desired uniform physical appearance.

It is therefore an object of this invention to provide a method for stretching thermoplastic sheet and the like materials which yields the foregoing desired results.

It is a further object of this invention to provide a method for minimizing the transverse contraction of the thermoplastic during the stretching operation.

Still another object of this invention is to provide a process for stretching thermoplastic sheets and the like materials which will yield a product of substantially uniform thickness.

Yet another object of this invention is to provide a unique apparatus which is particularly suitable for carrying out the process of this invention.

Figure 2:
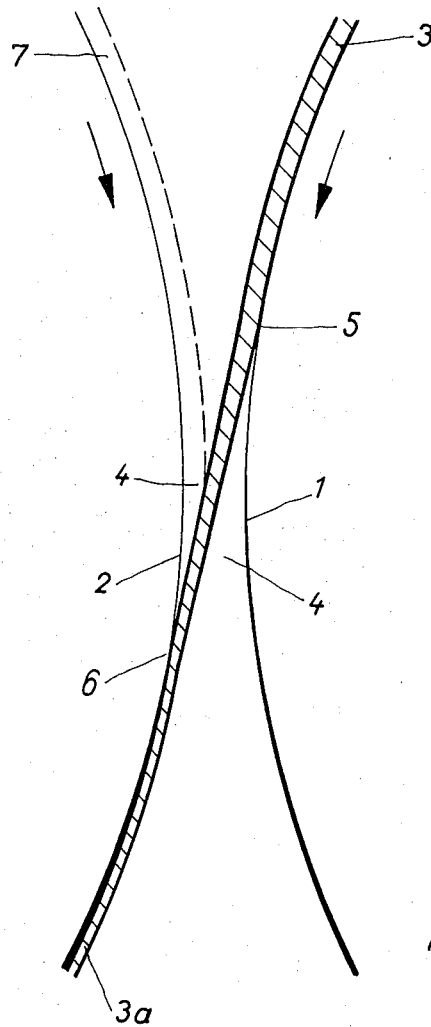
Figure 3:
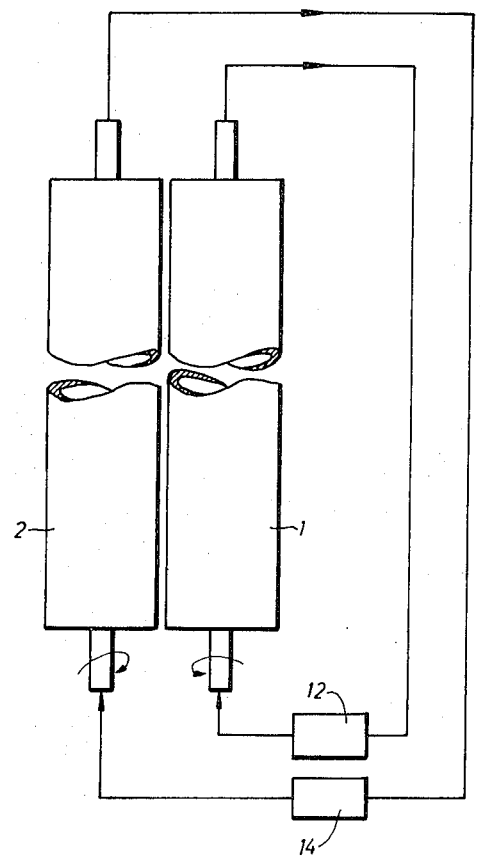

The foregoing objects and others which will become apparent from the following description and the accompanying drawing are accomplished in accordance with this invention as illustrated in the drawing in which:

FIG. 1 is a diagrammatic illustration of an apparatus for longitudinally stretching sheeting and the like materials and FIG. 2 is an enlarged cross section of a sheet of thermoplastic material being stretched in the stretching gap of the apparatus of FIG. 1. The process of the invention comprises stretching organic thermoplastic sheets, films and the like in a gap between a heated feed or entrance roller spaced from a heated delivery or exit roller by rotating the rollers in opposite directions, the speed of rotation of the delivery roller being greater than the speed of rotation of the feed roller, while the thermoplastic material on the feed roller which is in an unstretched condition is subjected to a feed roller surface temperature below the softening temperature of the unstretched thermoplastic and the stretched thermoplastic material on the delivery roller is subjected to a delivery roller surface temperature above the softening temperature of the material in the unstretched state, but below the softening temperature of the thermoplastic material in its stretched state. A unique apparatus in which the process of the invention may be carried out comprises a rotatable feed roller spaced from a rotatable delivery roller and having an axis substantially parallel to the axis of the delivery roller, a means for heating the surface of the feed roller and a means for heating the surface of the delivery roller, and a shield substantially covering the space between the feed roller and the delivery roller.

The stretching of the thermoplastic material, particularly if the thermoplastic is a polycarbonate sheet, for example, increases the softening point of the crystalline organic sheets to higher temperatures than those at which the materials would have softened before unstretched state. As a consequence, the surface temperature of the delivery roller must be kept far enough above the surface temperature of the feed roller and at a temperature sufficiently above the softening temperature of the unstretched sheet for the temperature in the gap between the rollers to be high enough to permit the sheet to be stretched without heating the sheet to its softening point on the two rollers themselves. This objective is preferably achieved by maintaining the temperature of the entrance or feed roller at least about 5° to about 50° C. below the softening temperature of the material in its unstretched state and by maintaining the temperature of the exit or delivery rollers about 5 to about 80° C. below the softening temperature of the material in its stretched state. For example, if the material being treated is a polycarbonate foil having a softening temperature in its unstretched state of about 150° C., the temperature of the entrance roller should be about 5 to about 50° C. below this temperature, that is, between about 100 and about 145° C. If the softening temperature of this same foil in its stretched state is about 240° C., then the temperature of the exit roller must be about 5 to about 80° C. below this temperature, that is, between about 160 and about 235° C. The process of the invention limits the stretching operation to the free length of sheet in the gap extending from the point at which the sheet leaves the feed roller, to the point at which it contacts the delivery roller, thus permitting the stretched sheet to undergo only a very limited contraction in width by the time the material is rewound onto the delivery roller. In order to keep the surface temperature of the delivery roller in the stretching gap particularly effective for the purposes of this invention, the gap between the delivery and feed rollers is covered or shielded by a wedge or shield occupying the area between the rollers at the inlet end of the continuous sheet as shown at 8 in FIG. 1.

The speed at which the rollers rotate with respect to one another depends on the stretching ratio desired in the treatment of the thermoplastic material. By the term "stretching ratio" is meant the ratio between the thickness of the foil in its unstretched state to the thickness of the foil in its stretched state. For example, if the thickness of the unstretched foil is 0.07 mm. and the thickness of the stretched foil is 0.02 mm., then the stretching ratio is 0.07/0.02 or 3.5:1. As a consequence, the feed roller will rotate at a speed equivalent to the rate of feed of the material to be treated into the stretching apparatus while the speed of the delivery roller may be several times higher than the peripheral speed of the feed roller or even higher depending upon the degree of stretching desired. To achieve optimum foil characteristics, stretching ratios between about 2:1 and about 5:1 should be used. In the case of a polycarbonate, the best stretching ratio lies in the range of from about 3:1 to about 4:1.

For each type of thermoplastic material being treated and for each formulation within each general type, the critical temperatures of the feed and delivery rollers and the temperature in the gap therebetween will be different. However, as long as the temperatures satisfy the limitations stated herein, even though the specific temperatures within those limitations must of necessity vary with each type and formulation of the materials being treated, the process of this invention may be carried out easily and efficiently to yield a thermoplastic having optimum physical properties with little or no transverse contraction of the material while it is being treated. It is particularly important in a stretching operation of this type that the transverse contraction is kept at an absolute minimum since transverse contraction during the stretching operation results in fluctuations in the thickness across the width of the sheet. As a consequence, the edges of the sheet will be thicker than the center of the sheet and the woundup sheet will be difficult to work with in later cutting processes, for example. Further, the differential thicknesses require that the thick edges be trimmed off and discarded, thus reducing profits. Experience dictates that in order to obtain a satisfactory product, the transverse contraction must be far less than 10% of the width of the unstretched foil, and preferably below 5%.

Within the limitations of this invention, the properties of the stretched thermoplastic material are greatly enhanced by the stretching operation while the transverse contraction of the thermoplastic material during the stretching operation is kept to a minimum and the stretched thermoplastic obtained has a substantially uniform thickness. Further, as has already been indicated, although the instant process is eminently suitable for use with any desired thermoplastic material it is most preferably employed in treating thermoplastic polycarbonates.

With reference to the drawings in which a preferred embodiment of the invention is illustrated with a polycarbonate sheet, for example, the feed roller 1 is driven in an opposite direction of rotation from that of the delivery roller 2, and each roller is activated by its own individual drive mechanism which is not shown. The feed roller 1 contains an internal heating means 12 which heats the surface of the feed roller 1 to a temperature below the softening point of the unstretched sheet 3. When the sheet being treated is a polycarbonate sheet prepared from 4,4'-dihydroxydiphenyl-2,2-propane and phosgene, and has a thickness of about 0.07 mm., the surface temperature of the feed roller 1 should be approximately 130° C. since the softening temperature of such a polycarbonate sheet in the unstretched state is about 150° C.

The delivery roller 2 also contains an internal heating means 14 which heats the surface of the delivery roller to a temperature below the softening temperature of the stretched sheet 3a, but far above the softening temperature of the sheet in its unstretched condition and, preferably, the axis of the delivery roller is maintained substantially parallel to the axis of the feed roller. In the case of the polycarbonate sheet described, for example, the surface temperature of the delivery roller 2 is approximately 210° C. and the softening temperature of the stretched sheet 3a is approximately 240° C. Stretching takes place in the gap 4 formed between rollers 1 and 2, each of which are partly surrounded by the sheet being treated (cf. FIG. 2).

The unstretched sheet 3 travelling into the gap 4 on the feed roller 1 leaves the feed roller at the line 5 which extends at right angles to the plane of the drawing and the position of which is governed by the diameter of the delivery roller 2. The length of sheet between the two lines 5 and 6 is the stretching zone of the sheet which comprises the gap 4. Both the delivery roller 2 and the feed roller 1 may be internally heated as required in any suitable manner such as, for example, by means of steam, electricity, oil or any other suitable expedient.

The sheet temperature of approximately 180° C. required for stretching the described polycarbonate sheet is maintained between the surface temperature of the feed roller 1 which is approximately 130° C. and the surface temperature of the delivery roller 2 which is approximately 210° C. so that the layer of hot air 7 carried along on the surface of the delivery roller 2 into the gap 4, is sufficient to heat the sheet in the gap 4 between the zone 5–6 to the required stretching temperature. A wedge 8 is arranged transversely of the sheet in the zone between the two rollers 1 and 2, to insure that the layer of hot air carried along on the surface of the delivery roller 2 reaches into the stretching gap 4 and is not diffused beforehand.

Based on the described polycarbonate, where the stretching ratio between the rollers 1 and 2 is adjusted to about 1 to about 3.5, then the thickness of the polycarbonate sheet in its unstretched state is about 0.07 mm. compared to about 0.02 mm. in its stretched state. In its unstretched condition, the sheet is about 1200 mm. wide while in the stretched condition it is about 1145 mm. wide. Accordingly, the transverse contraction of the sheet during the stretching operation amounts to only about 4.6%. This transverse contraction is so small that the thickness of the sheet as measured over its cross section is uniform throughout except for a narrow marginal strip which, in the example described, is approximately 10 mm. wide.

The process of this invention can be and is most effective if carried out with continuous sheets of thermoplastic materials, although the process may also be carried out on smaller lengths of sheets if desired.

In the foregoing discussion, any other type of thermoplastic material may be substituted for the polycarbonate sheeting described and any other form of the thermoplastic material may be similarly treated such as, for example, films, foils and the like. Other types of thermoplastic materials which may be treated in accordance with this invention are polyurethanes, polyesters, polyolefins, polyamides, and the like. This listing is not to be construed as limitative upon the scope of the invention, but merely illustrative.

It is to be understood that any of the materials and conditions mentioned as suitable herein can be substituted for its counterpart in the foregoing description and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. In a method of stretching of a sheet of crystalline organic thermoplastic polymer, the steps consisting essentially of maintaining a rotating heated feed roller and an adjacent and parallel rotating heated delivery roller with a stretching zone therebetween, said rollers rotating oppositely to each other and said delivery roller rotating at a speed sufficiently greater than that of said feed roller to effect a stretch ratio in the range 2:1 to 5:1, passing said sheet from said feed roller to said delivery roller through said stretching zone at a stretching temperature while maintaining the transverse contraction thereof to less than 10 percent, maintaining the surface of said feed roll at a temperature sufficently high to heat the sheet but below the softening point of the unstretched sheet thereon and below said stretching temperature, maintaining the surface of said delivery roller at a delivery temperature substantially above said stretching temperature and above the softening point of the unstretched sheet but below the softening point of the stretched sheet thereon, the feed roller and the delivery roller being closely spaced with the gap between the rolls being not less than the thickness of the sheet and so that softening point of the unstretched sheet but below the surface of the delivery roller carries a layer of hot air into the stretching zone for heating of the sheet in the stretching zone to said stretching temperature, the delivery roller being the only heating means for heating the sheet after it leaves the feed roller.

2. Method according to claim 1, wherein said polymer is polycarbonate.

3. Method according to claim 2, wherein said stretch ratio is in the range of about 3:1 to about 4:1.

4. In a method of stretching a sheet of a crystalline polycarbonate prepared from 4,4' - dihydroxy diphenyl-2,2-propane and phosgene, the steps consisting essentially of maintaining a rotating heated feed roller and an adjacent and parallel rotating heated delivery roller with a stretching zone therebetween, said rollers rotating oppositely to each other and said delivery roller rotating at a speed sufficiently greater than that of said feed roller to effect a stretch ratio in the range of 3:1 to 4:1, passing said sheet from said feed roller to said delivery roller through said stretching zone at a stretching temperature of about 180° C. while maintaining the transverse contraction thereof to less than 10 percent, maintaining the surface of said feed roll at a feed temperature of about 130° C., maintaining the surface of said delivery roller at a delivery temperature of about 210° C., the feed roller and the delivery roller being closely spaced with the gap between the rolls being not less than the thickness of the sheet and so that the surface of the delivery roller carries a layer of hot air into the stretching zone for heating the sheet in the stretching to said stretching temperature, the delivery roller being the only heating means for heating the sheet after it leaves the feed roller and preventing diffusion of said layer of hot air away from said stretching zone by providing a shield therefor in said stretching zone.

5. Process according to claim 1, the sheet being polycarbonate, polyurethane, polyester, polyolefin or polyamide.

6. Process according to claim 1, the sheet being polycarbonate prepared from 4,4' - dihydroxydiphenyl-2,2-propane and phosgene.

7. Process according to claim 1, and preventing diffusion of said layer of hot air away from the stretching zone by providing a shield therefor in said stretching zone.

8. Process according to claim 1, and maintaining the surface of said feed roller at a temperature of about 5 to 50° C. below the softening point of the unstretched sheet and maintaining the surface of said delivery roller about 5 to 80° C. below the softening point of the material in the stretched state.

9. Process according to claim 2, and maintaining the surface of said feed roller at a temperature of about 5 to 50° C. below the softening point of the unstretched sheet and maintaining the surface of said delivery roller about 5 to 80° C. below the softening point of the material in the stretched state.

References Cited

UNITED STATES PATENTS

| | | | |
|---|---|---|---|
| 3,076,232 | 2/1963 | Dengler | 264—288 |
| 3,214,503 | 10/1965 | Markwood, Jr. | 264—210 R |
| 3,445,561 | 5/1969 | Huff et al. | 264—210 F |
| 3,574,814 | 4/1971 | Falkai et al. | 264—288 |

FOREIGN PATENTS

| | | | |
|---|---|---|---|
| 691,806 | 8/1964 | Canada | 264—288 |
| 693,056 | 8/1964 | Canada | 264—288 |
| 760,954 | 9/1953 | Germany | 264—288 |

ROBERT F. WHITE, Primary Examiner

J. B. LOWE, Assistant Examiner

U.S. Cl. X.R.

264—DIG 73

PO-1050
(5/69)

UNITED STATES PATENT OFFICE
CERTIFICATE OF CORRECTION

Patent No. 3,796,785            Dated March 12, 1974

Inventor(s)    Wilhelm Rest and Karl Huff

It is certified that error appears in the above-identified patent and that said Letters Patent are hereby corrected as shown below:

Col. 5, lines 4 and 5, cancel "softening point of the unstretched sheet but below"

Signed and sealed this 10th day of September 1974.

(SEAL)
Attest:

McCOY M. GIBSON, JR           C. MARSHALL DANN
Attesting Officer              Commissioner of Patents